United States Patent
Liu et al.

(10) Patent No.: US 9,530,206 B2
(45) Date of Patent: Dec. 27, 2016

(54) AUTOMATIC 3D SEGMENTATION AND CORTICAL SURFACES RECONSTRUCTION FROM T1 MRI

(71) Applicant: SONY CORPORATION, Tokyo (JP)

(72) Inventors: Ming-Chang Liu, San Jose, CA (US); Bi Song, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 63 days.

(21) Appl. No.: 14/675,265

(22) Filed: Mar. 31, 2015

(65) Prior Publication Data

US 2016/0292847 A1    Oct. 6, 2016

(51) Int. Cl.

| G06K 9/00 | (2006.01) |
|---|---|
| G06T 7/00 | (2006.01) |
| G06T 15/00 | (2011.01) |
| G06T 11/00 | (2006.01) |
| G06K 9/46 | (2006.01) |
| G06K 9/62 | (2006.01) |

(52) U.S. Cl.
CPC ........... *G06T 7/0012* (2013.01); *G06K 9/4604* (2013.01); *G06K 9/6267* (2013.01); *G06T 7/0079* (2013.01); *G06T 11/003* (2013.01); *G06T 15/00* (2013.01); *G06T 2207/10004* (2013.01); *G06T 2207/10081* (2013.01); *G06T 2207/10088* (2013.01)

(58) Field of Classification Search
USPC ................................................ 382/128–134
See application file for complete search history.

(56) References Cited

U.S. PATENT DOCUMENTS

| 6,430,430 | B1 | 8/2002 | Gosche |  |
|---|---|---|---|---|
| 6,754,374 | B1* | 6/2004 | Miller | ...................... G06K 9/32 |
|  |  |  |  | 382/128 |
| 8,031,919 | B2 | 10/2011 | Eskildsen et al. |  |
| 2003/0068074 | A1 | 4/2003 | Hahn |  |
| 2006/0074290 | A1* | 4/2006 | Chen | ..................... G06T 7/0022 |
|  |  |  |  | 600/407 |
| 2006/0222222 | A1* | 10/2006 | Fujita | .................... G06T 7/0012 |
|  |  |  |  | 382/128 |
| 2008/0123922 | A1* | 5/2008 | Gielen | ..................... A61B 5/06 |
|  |  |  |  | 382/131 |

(Continued)

OTHER PUBLICATIONS

United States Patent and Trademark Office (USPTO), International Search Report and Written Opinion, PCT International Application No. PCT/US2016/013805, issued on Mar. 17, 2016, pp. 1-10, with claims searched, pp. 11-16, counterpart to U.S Appl. No. 14/675,265.

(Continued)

*Primary Examiner* — Alex Liew
(74) *Attorney, Agent, or Firm* — Trellis IP Law Group, PC

(57) ABSTRACT

An apparatus and method for performing automatic 3D image segmentation and reconstruction of organ structures, which is particularly well-suited for use on cortical surfaces is presented. A brain extraction process removes non-brain image elements, then classifies brain tissue as to type in preparation for a cerebrum segmentation process that determines which portions of the image information belong to specific physiological structures. Ventricle filling is performed on the image data based on information from a ventricle extraction process. A reconstruction process follows in which specific surfaces, such as white matter (WM) and grey matter (GM), are reconstructed.

20 Claims, 17 Drawing Sheets

(56) References Cited

U.S. PATENT DOCUMENTS

| | | | |
|---|---|---|---|
| 2008/0123923 A1* | 5/2008 | Gielen | G06K 9/3216 382/131 |
| 2012/0099779 A1* | 4/2012 | Gupta | G06K 9/38 382/133 |
| 2012/0197104 A1 | 8/2012 | Posse et al. | |

OTHER PUBLICATIONS

Shattuck et al., "Magnetic Resonance Image Tissue Classification Using a Partial Volume Model", NeuroImage 13, 856-876, 2001. [Retrieved Mar. 1, 2016]. Retrieved from Internet: <http://neuroimage.usc.edu/paperspdf/NI01Shattuck.pdf>.

Nigro, et al., "Fully Automated Segmentation of the Pons and Midbrain Using Human T1 MR Brain Images", PLOS One, Jan. 2014, vol. 9, Issue 1. [Retrieved Mar. 2, 2016]. Retrieved from Internet: <http://www.ncbi.nlm.nih.gov/pmc/articles/PMC3904850/pdf/pone.0085618.pdf.

Tosun et al., "Cortical Surface Segmentation and Mapping", NeuroImage, 2004. [Retrieved Mar. 2, 2016]. Retrieved from internet: <http://ncbi.nlm.nih.gov/pmc/articles/PMC4587756/pdf/nihms72357.pdf>.

Tosun, Duygu, et al., "Cortical surface segmentation and mapping", NeuroImage 23 (2004) S108-S118, available online Sep. 11, 2004, doi:10.1016/j.neuroimage.2004.07.042.

Dale, Anders M., et al., "Cortical Surface-Based Analysis", NeuroImage 9, 179-194 (1999), article ID nimg.1998.0395.

* cited by examiner

MRI data

Initialization

Initialization

Extraction Result

Extraction Result

MRI data

Initialization

Initialization

Extraction Result

Extraction Result

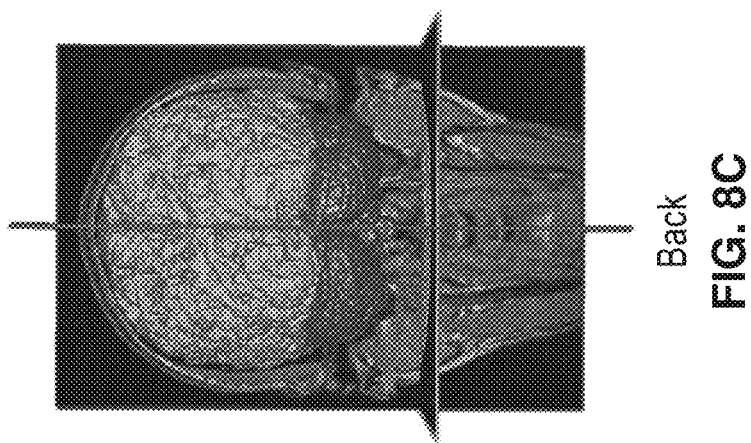
FIG. 8C Back
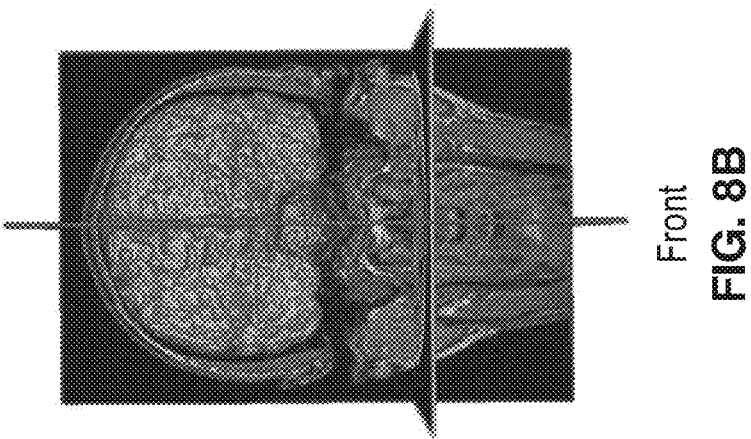
FIG. 8B Front
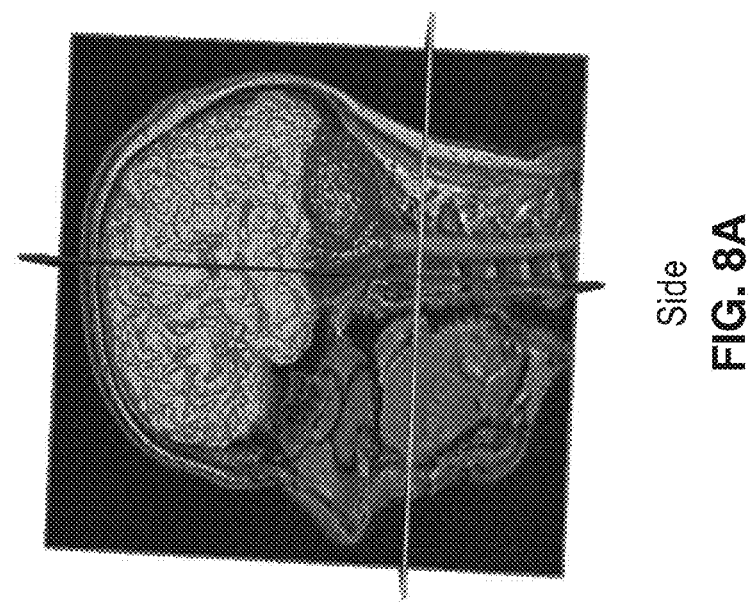
FIG. 8A Side

AUTOMATIC 3D SEGMENTATION AND CORTICAL SURFACES RECONSTRUCTION FROM T1 MRI

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This disclosure pertains generally to medical imaging, and more particularly to automatically segmenting of 3D medical images and reconstructing structural surfaces from the medical images.

2. Background Discussion

One important field for medical imaging is in diagnosing brain conditions. Segmentation and reconstruction of cerebral cortical surfaces from T1-weighted magnetic resonance images (MRI) is an important issue in neuroscience and medicine. This procedure is required for quantitative brain analysis, visualization, cortical mapping and surgical planning.

Many approaches have been presented for brain extraction that utilize deformable models which are initialized either manually, or automatically, but that operate for half-head data only (i.e., the less complex upper half). Typically, filling of ventricles is a manual step, or it is based on a registration process, such as atlas registration which is a slow processor intensive technique which generally requires more than about ten hours. During surface reconstruction, many approaches merely address the problem of reconstructing the white matter (WM) surface or the geometric central layer of the cerebral cortex. Some reconstructing techniques utilize a deformation model initialized with a sphere to achieve a final surface with spherical topology, which requires significant processing that generally requires more than twenty hours.

In addition, at the present time the process of performing segmentation and reconstruction involves significant levels of human intervention/interaction to provide accurate representations.

Accordingly, a need exists for fully automated processing of segmentation and reconstruction on MRI images of cerebral cortical surfaces.

BRIEF SUMMARY

The technology presented provides an accurate and fully automated means for processing medical images, such as MRI or CT images, of the brain or other organs, such as the liver, spleen or other organs to be imaged. Medical imaging data is utilized in combination with anatomical information for the body element being imaged. In a preferred embodiment, the segmentation and reconstruction is performed on brain regions as these are perhaps the most complex, although the techniques can be generally applied to other physiological structures. In the case of medical imaging of the brain, the system automatically determines brain structures in a brain extraction process that removes non-brain image elements. Brain tissues are then classified as to brain tissue types, in preparation for a cerebrum segmentation process that determines which portions of the image information belong to specific physiological structures, such as the cerebellum and brain stem as distinguished from the cerebrum. Ventricle filling is then performed on the image data based on information from a ventricle extraction process. A reconstruction process follows in which specific surfaces, such as white matter (WM) and grey matter (GM), are reconstructed.

Numerous benefits can be gained from using this technology, such as the streamlining of surgery workflow for better clinical outcomes.

Further aspects of the disclosure will be brought out in the following portions of the specification, wherein the detailed description is for the purpose of fully disclosing preferred embodiments of the disclosure without placing limitations thereon.

BRIEF DESCRIPTION OF THE SEVERAL VIEWS OF THE DRAWING(S)

The disclosure will be more fully understood by reference to the following drawings which are for illustrative purposes only:

FIG. 8A through FIG. 8C are images of segmentation results according to an embodiment of the disclosed technology, as shown from different angles (side, front, back).

DETAILED DESCRIPTION

Figure 1A:
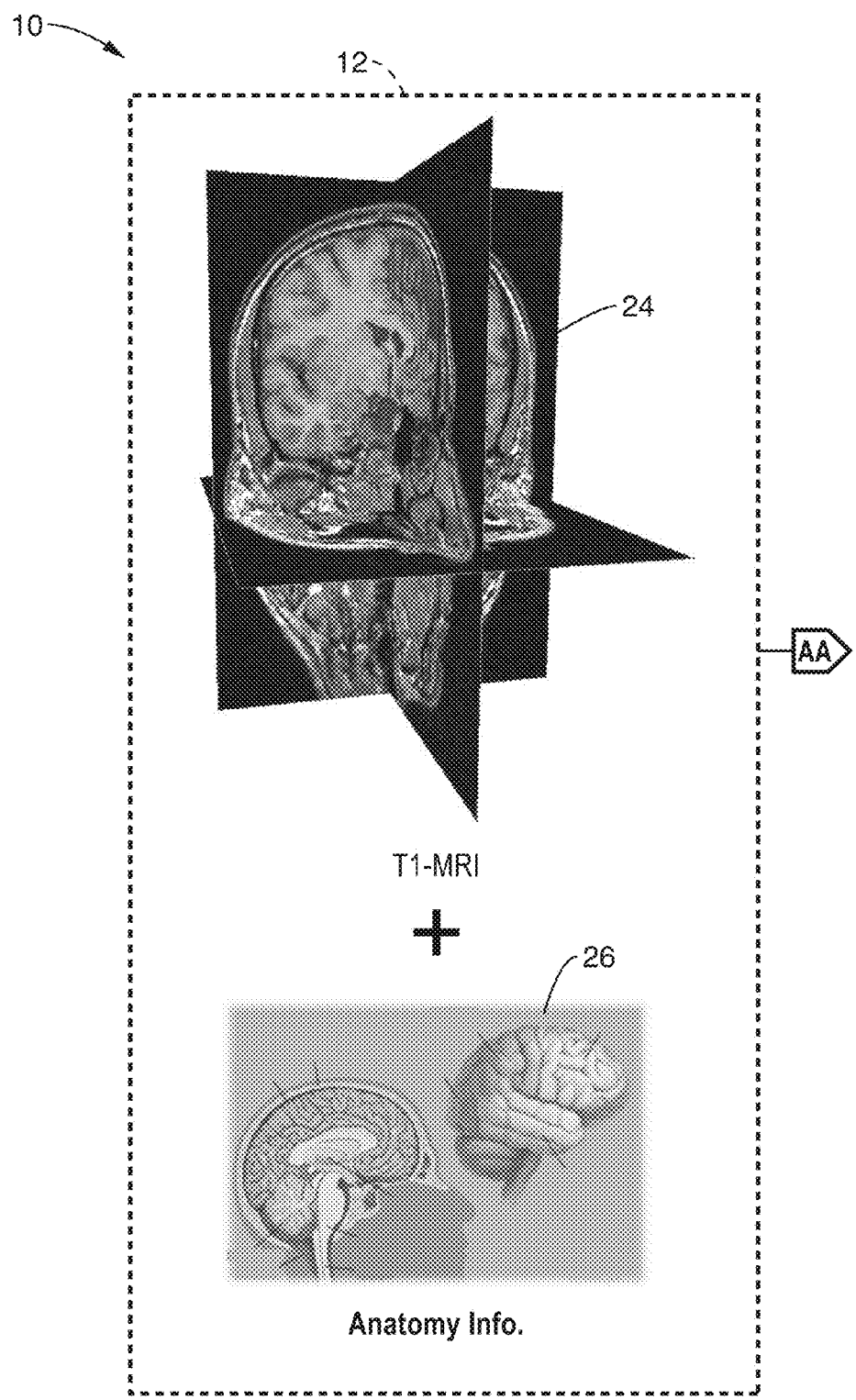
FIG. 1A through FIG. 1D are a flowchart of brain structural surface reconstruction according to an embodiment of the presented technology.
Figure 1B:
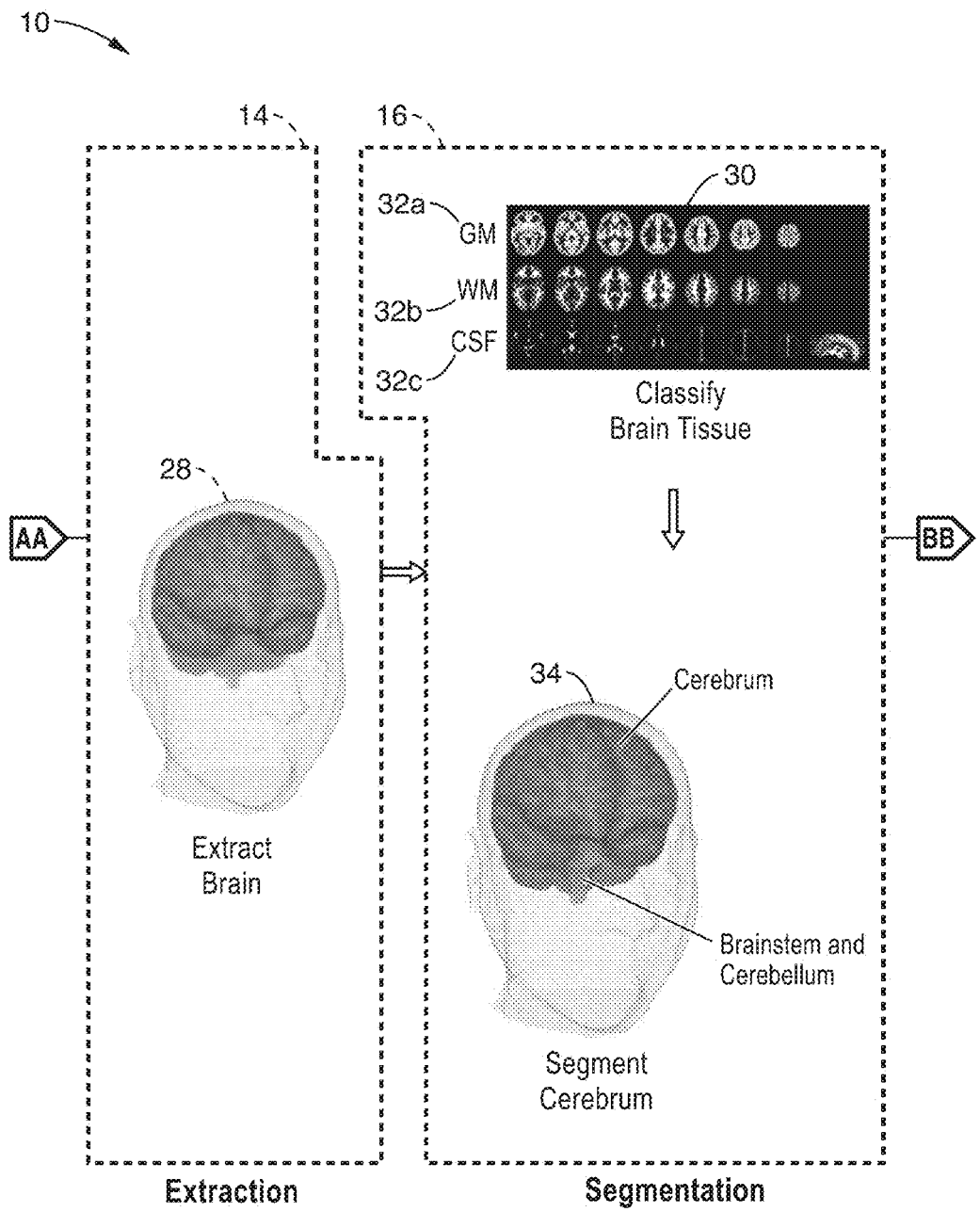

This disclosure addresses the problem of segmentation and reconstruction of cortical surfaces, including reconstructing both inner-surfaces and outer-surfaces of the cortex. The outer-surface is the pial surface, hereafter referred to Gray Matter (GM) surface. The inner-surface is gray-white boundary, hereafter referred to White Matter (WM) surface. The reconstruction of the cortical surfaces is a complex procedure which is broken into a number of subtasks.

FIG. 1A through FIG. 1D illustrate an example embodiment 10 of automatic 3D segmentation and cortical surfaces reconstruction process from T1-MRI data. The process is shown in principle steps of receiving input information 12, extraction 14, segmentation 16, anatomical refinement 18, reconstruction 20, and output 22.

In FIG. 1A raw brain MRI data 24 is received from an MRI machine, with additional anatomical information 26 received, such as from a database. Extraction processing 14 commences in FIG. 1B to remove non-brain voxels 28 in head MRI volume, such as skin, bone, muscle, fat and dura. It is also preferable that the brain extraction process include non-uniformity correction which corrects non-uniformities in the raw MRI data due to magnetic field inhomogeneity.

A segmentation process 16 commences with classifying brain tissue 30 (showing GM 32a, WM 32b, and CSF 32c) based on brain information output from the brain extraction process. During tissue classification the areas in the MRI data are labeled (classified) by brain tissue type, such as according to gray matter (GM) 32a, white matter (WM) 32b, and cerebrospinal fluid (CSF) 32c. A cerebrum segmentation process 34 is performed to separate image information about the cerebellum and brain stem from the cerebrum. Cerebrum segmentation is performed by first identifying the midsagittal plane (MSP) in response to a process of searching for a plane in the space of medical image (e.g., MRI) data about which provides maximal symmetry. After which the corpus callosum and pons are identified from the intersection of MSP and the WM member function which is the output of tissue classification. The identity of one set of structures is then utilized in identifying others; in this case the corpus callosum and pons are utilized as the initial seeds of cerebrum and cerebellum/brain stem identification, respectively, with a graph-cut being applied for segmenting cerebrum imaging.

Figure 1C:
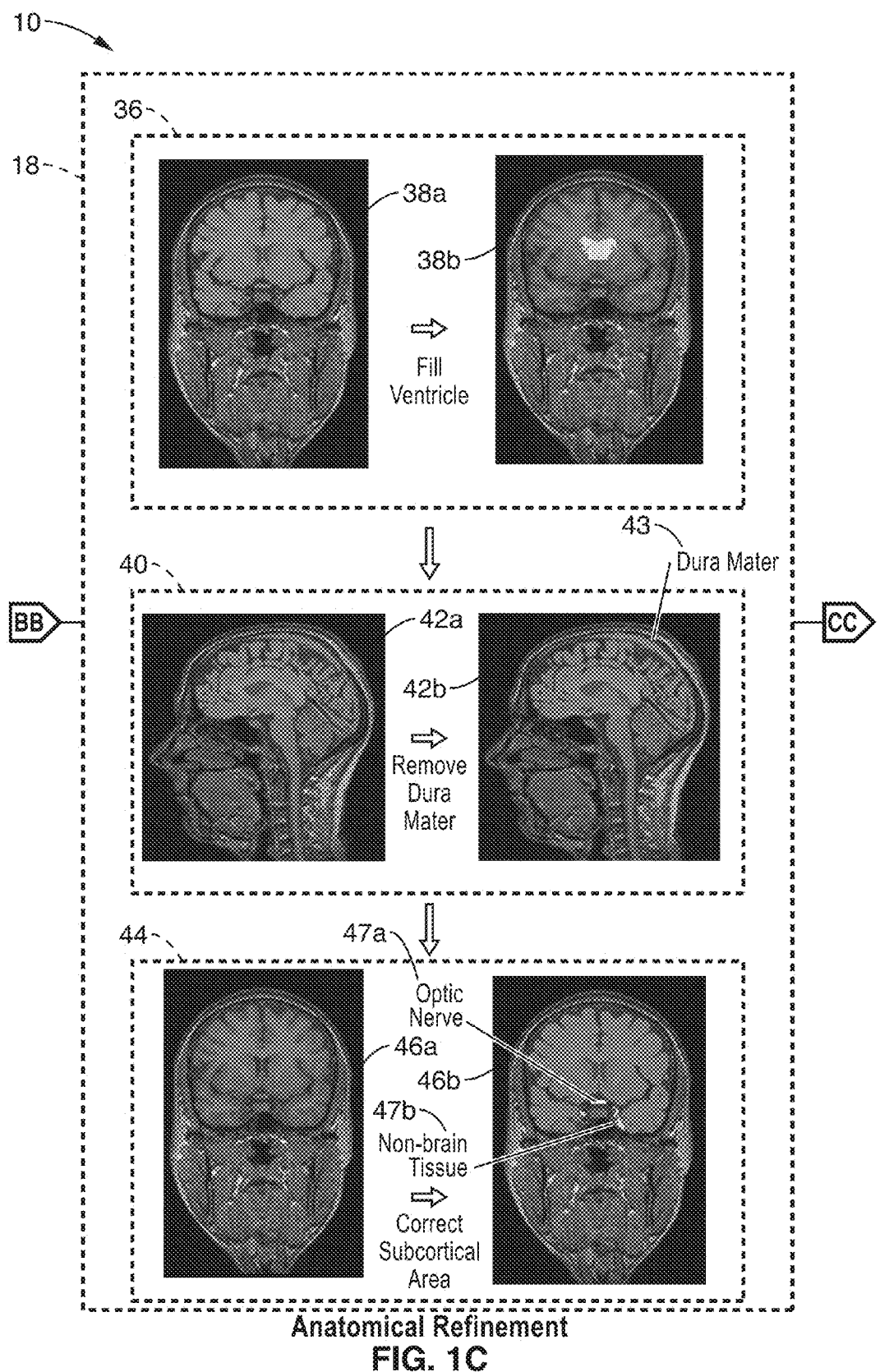

In FIG. 1C an anatomical refinement process 18 receives the segmentation information and performs a ventricle fill process 36 on the classified and segmented tissue areas. The figure shows before 38a, and after filling 38b. Ventricle information is received from a ventricle extraction process which is utilized during the ventricle filling process. Ventricle information is preferably received from multiple orientations, such as represented by front, side and back. During ventricle fill processing 36, the internal cavities in WM are filled before performing surface reconstruction in order to preserve the physical shape of the cortex, such as a spherical topology. For a spherical topology surface Euler characteristic x=2, such as in the relation x=V−E+F, where V are vertices, E are edges, and F are faces of the surfaces. Anatomical refinement 18 continues with a dura mater removal process 40, exemplified by before image 42a, and after image 42b which depicts dura mater 43 which was removed. After removal of dura mater, subcortical areas are corrected 44, as exemplified with a before image 46a, and an after image 46b depicting removal of image areas corresponding to optic nerve 47a, and non-brain tissue 47b.

Figure 1D:
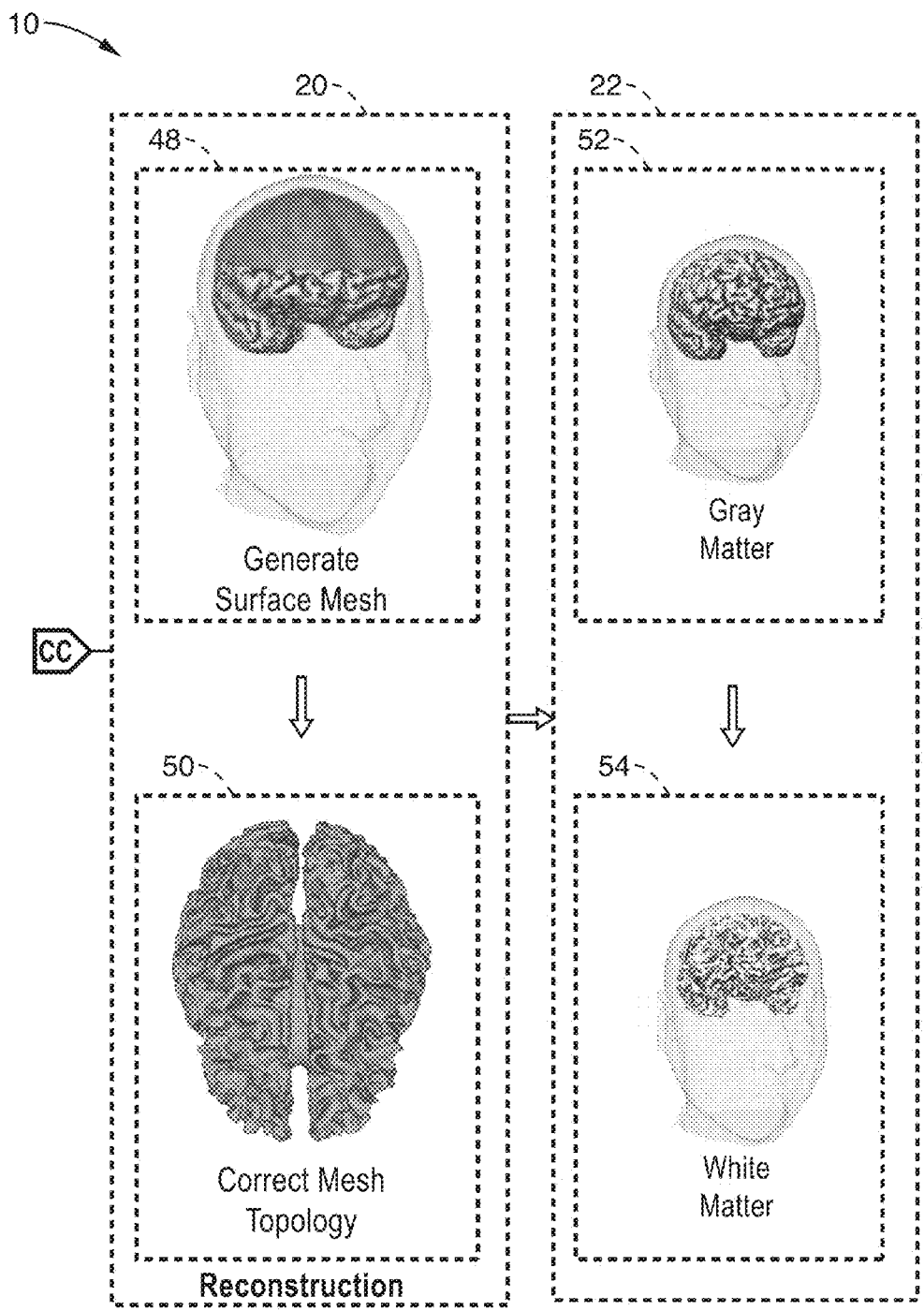
Figure 2A:
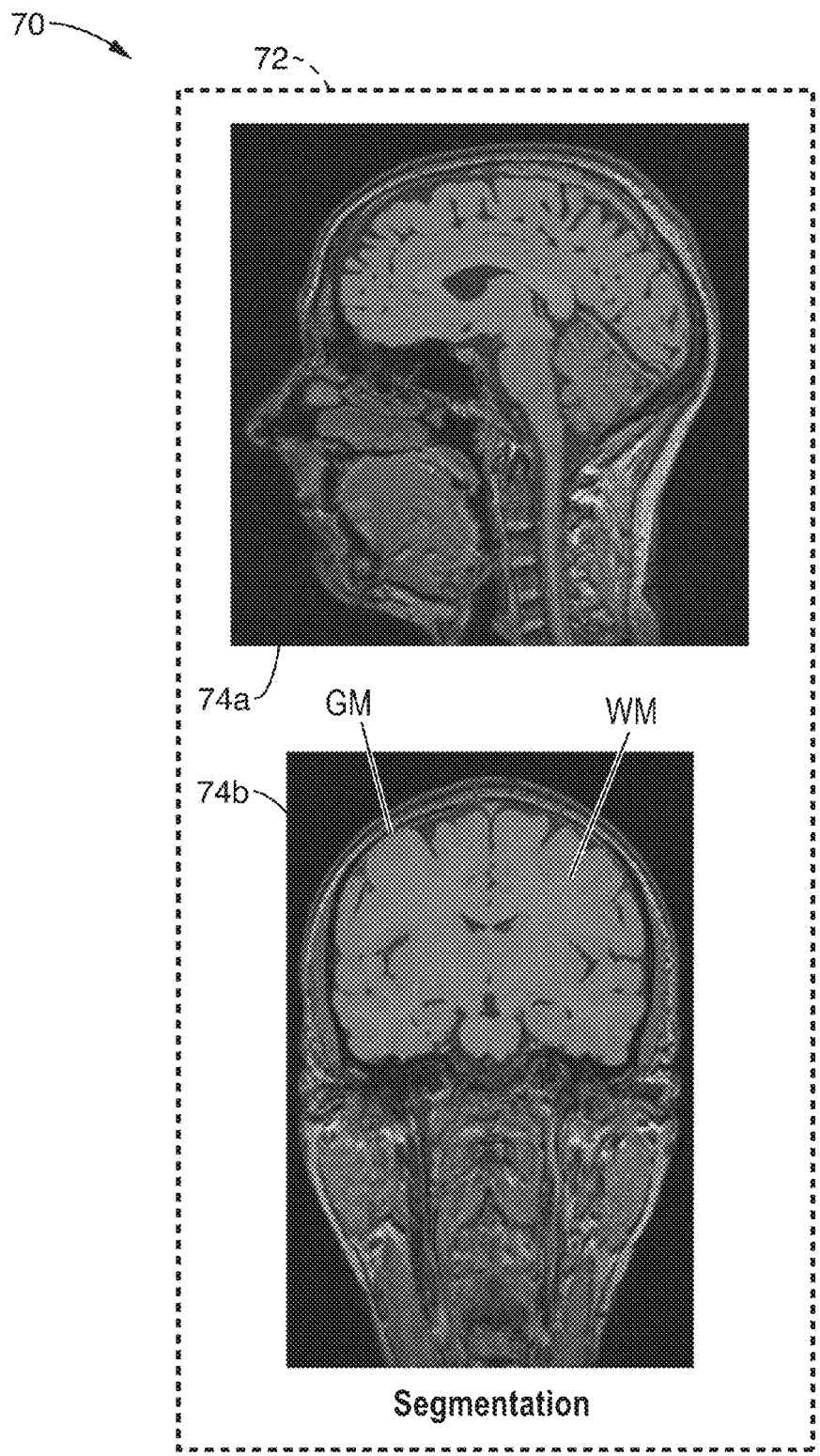
FIG. 2A through FIG. 2E are a flowchart of steps in the segmentation process according to an embodiment of the presented technology.
Figure 2B:
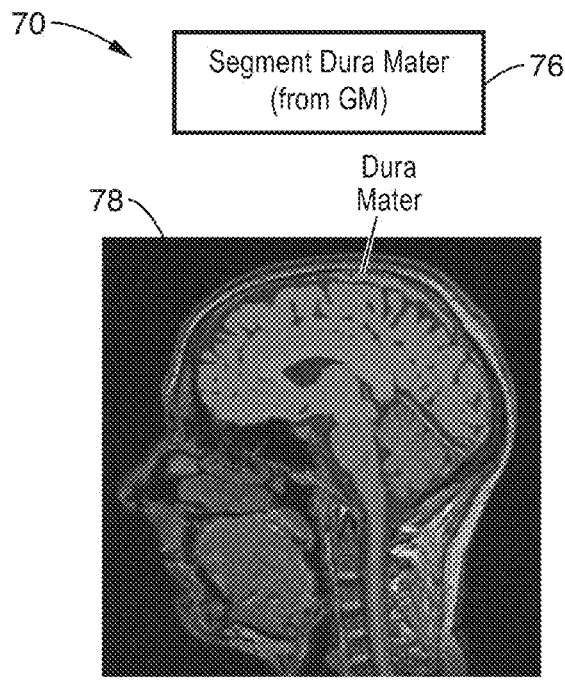
Figure 2C:
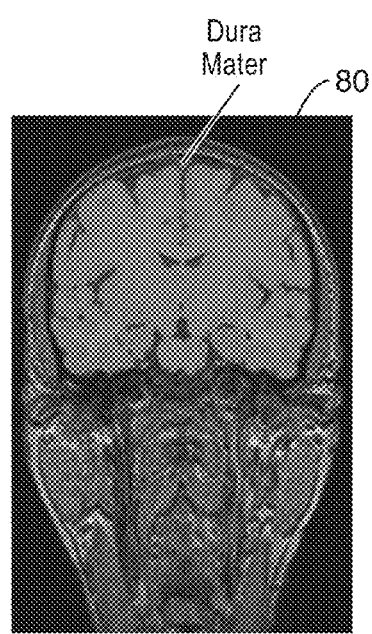
Figure 2D:
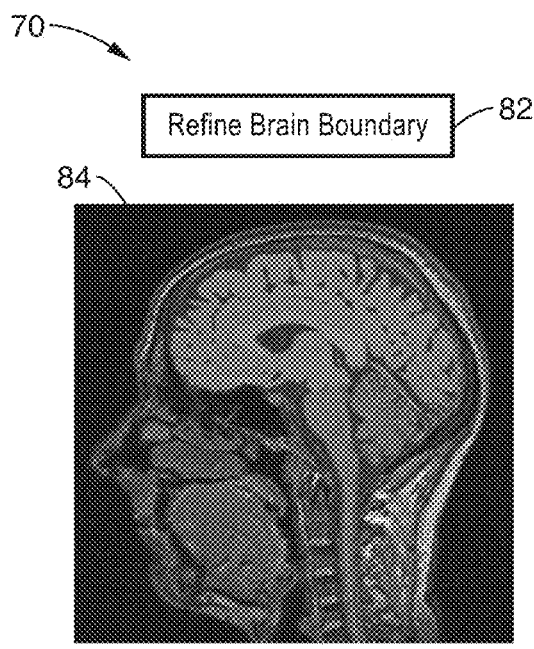
Figure 2E:

In FIG. 1D a reconstruction process 20 then takes place comprising generating a surface mesh 48, and correcting mesh topology 50. Output 22 from the reconstruction is depicted with a grey matter (GM) surface reconstruction 52, and a white matter (WM) surface reconstruction 54.

WM surface reconstruction preferably utilizes one or more computer graphics techniques, such as by way of example and not limitation a Marching Cube, to generate isosurface mesh from WM volume data. One of ordinary skill in the art will recognize that a Marching Cube is a special case of the well known Marching Cubes computer graphics algorithm which extracts a polygonal mesh of an isosurface from a three-dimensional scalar field (sometimes referred to as voxels) to render metasurfaces. Next, the image noise is reduced and topological defects of the surface are corrected.

Grey matter (GM) surface reconstruction utilizes WM segmentation results to refine GM and cerebrospinal fluid (CSF) classification to improve sulci description, followed by a surface mesh generating method, for example the same one used for generating the WM surface. It will be noted that in neuroanatomy, a sulcus (which is Latin for "furrow", and has the plural sulci) comprises a depression or groove in the cerebral cortex. The sulci surrounds a gyrus (pl. gyri), creating the characteristic folded appearance of the brain in humans and other mammals.

A sulci refinement process is preferably utilized during GM surface reconstruction. The system takes into account that WM is often more precisely segmented, and that GM covers the WM with sulci often in the GM valley and is filled with cerebrospinal fluid (CSF). Thus, the system utilizes WM segmentation to refine GM and CSF classification to improve sulci description of the reconstructed GM surface.

FIG. 2A through FIG. 2E illustrate a more detailed example embodiment 70 of the dura mater (Falx Cerebri) removal process, as was previously seen in block 40 of FIG. 1C within the anatomical refinement process. Information is received 72 from the segmentation process, exemplified with a side view 74a, and front view 74b, from the 3D segmentation. Dura mater is segmented 76 from the GM, such as based on spatial relation to brain and cortex thickness, with dura mater shown in image 78 in FIG. 2B, and image 80 in FIG. 2C. A process of refining the brain boundary 82 is seen with FIG. 2D and FIG. 2E. This boundary refinement process 82 is performed based on intensity difference with inward neighboring voxel and neighboring non-brain info, and output is seen with a refined boundary shown in image 84 in FIG. 2D, and image 86 in FIG. 2E.

Figure 3A:
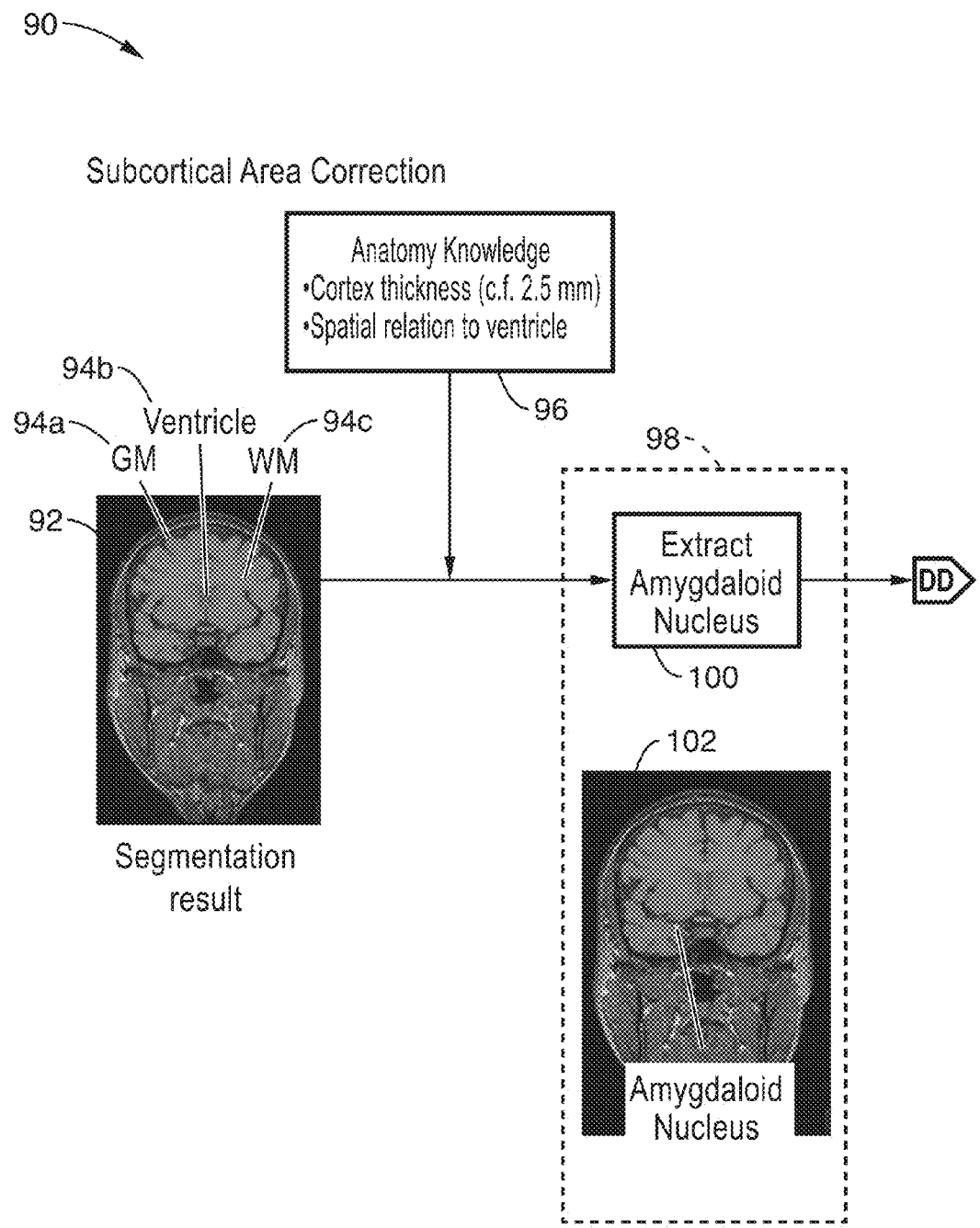
FIG. 3A and FIG. 3B are a flowchart of steps in correcting subcortical area within the anatomical refinement process according to an embodiment of the presented technology.
Figure 3B:
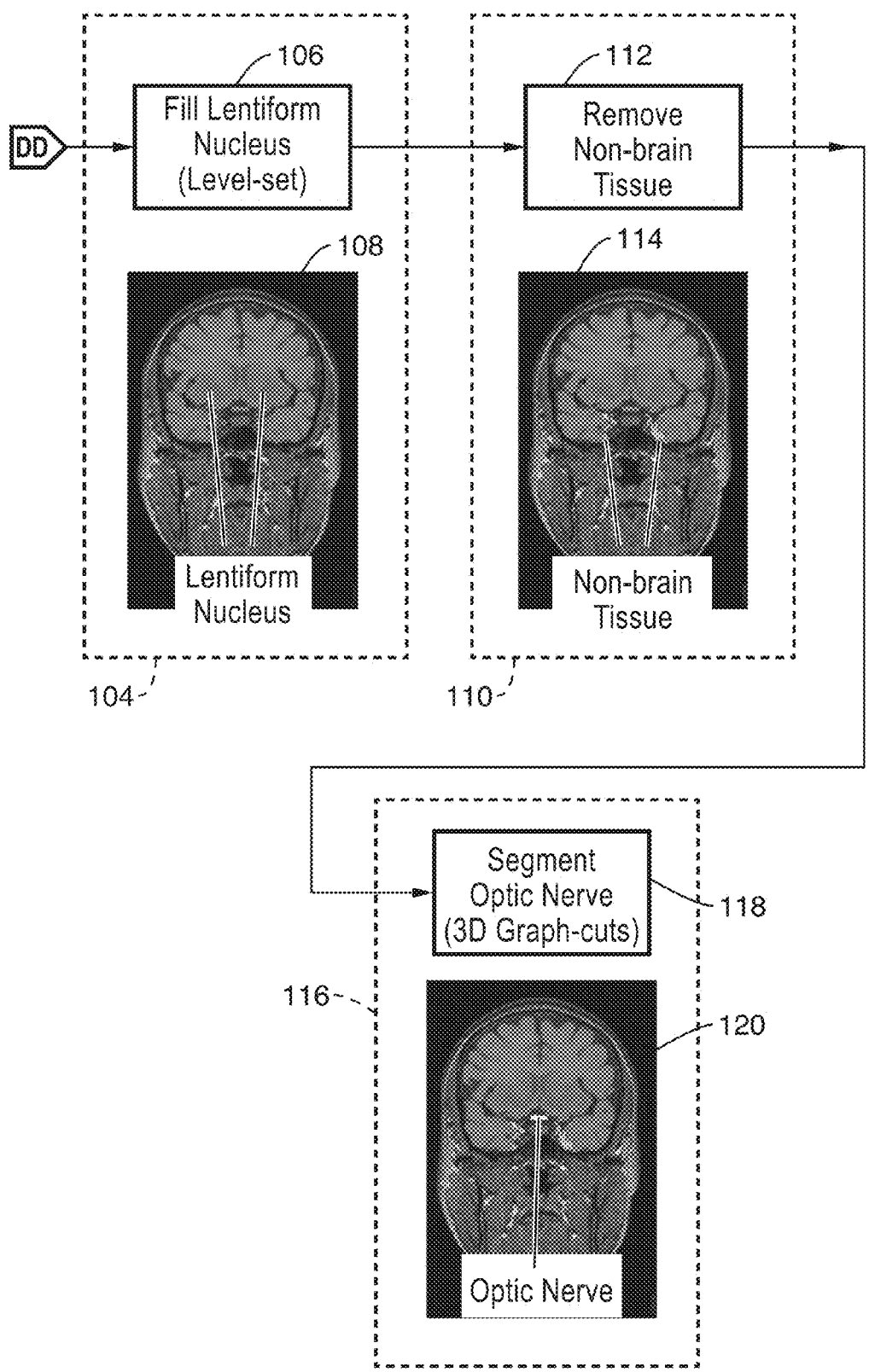
Figure 4A:
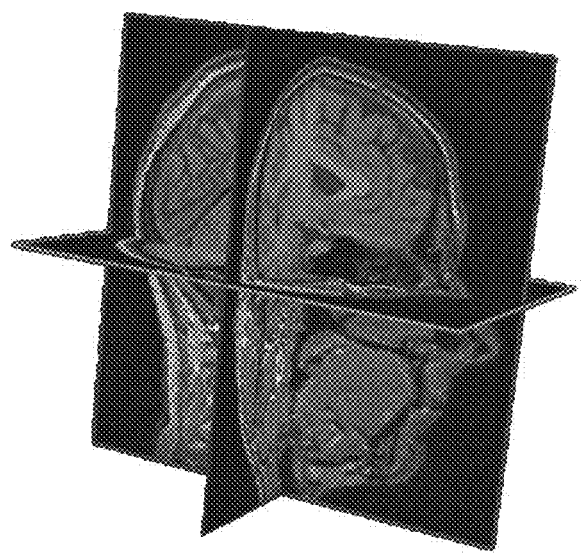
FIG. 4A through FIG. 4E are images of full-head image data as received, at initialization, and after extraction according to an embodiment of the disclosed technology.
Figure 4B:
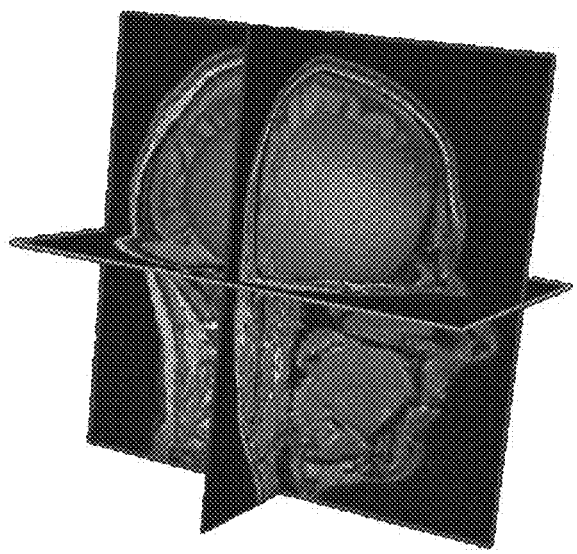
Figure 4C:
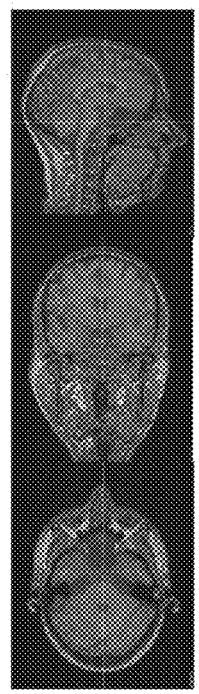
Figure 4D:
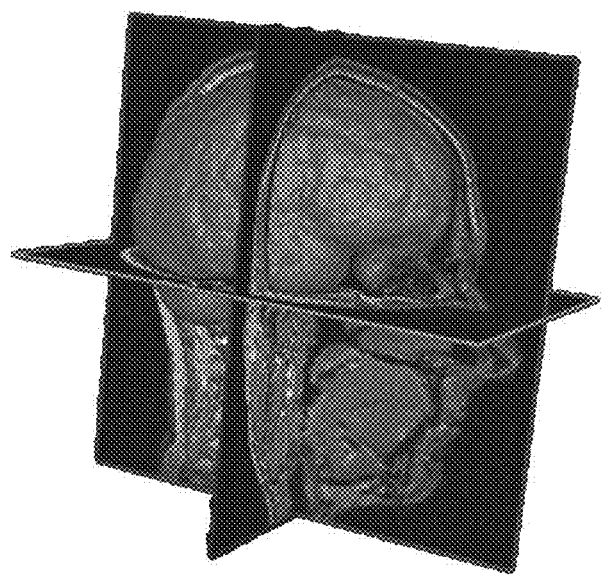
Figure 4E:
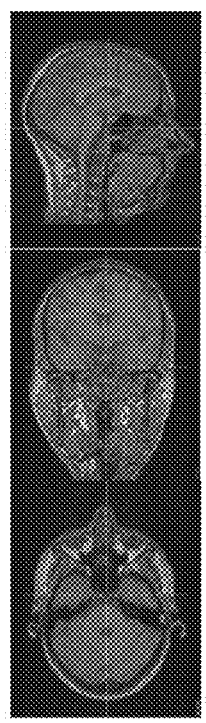
Figure 5A:
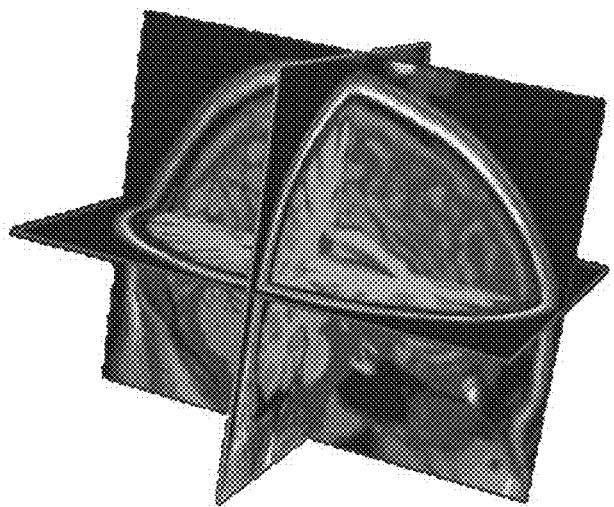
FIG. 5A through FIG. 5E are images of half-head image data as received, at initialization, and after extraction according to an embodiment of the disclosed technology.
Figure 5B:
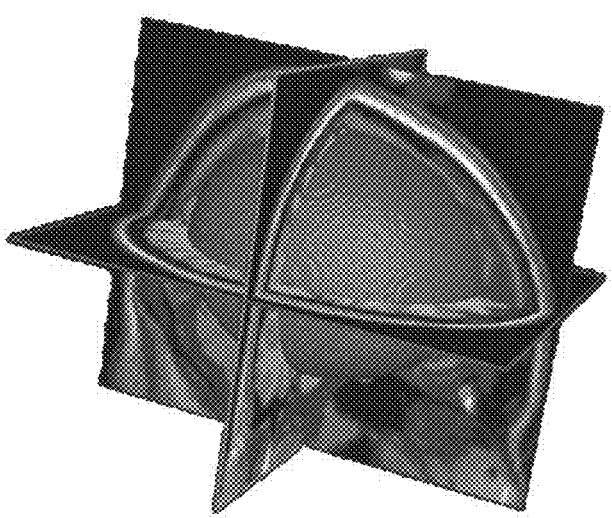
Figure 5C:
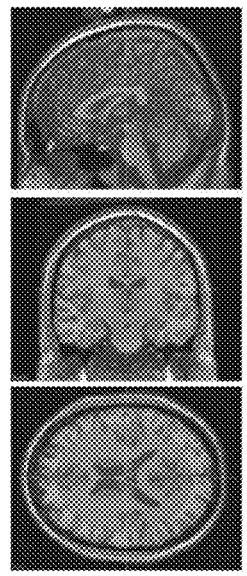
Figure 5D:
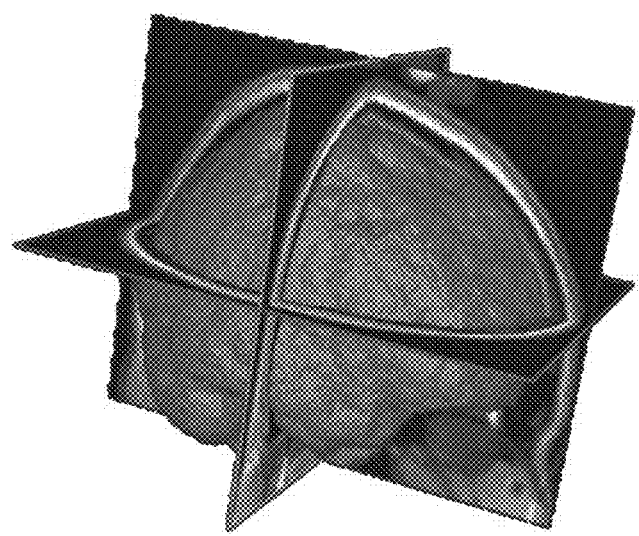
Figure 5E:
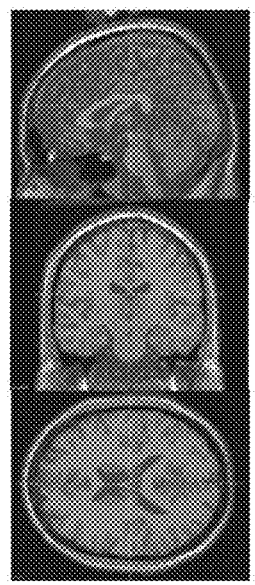

FIG. 3A and FIG. 3B illustrate a more detailed example embodiment 90 of subcortical area correction, as was previously seen in block 44 of FIG. 1C within the anatomical refinement process. A segmentation result 92 is utilized which provides at least GM 94a, ventricle 94b, and WM 94c segmentation. Information on anatomical elements is then utilized 96, such as in regard to cortex thickness (c.f. 2.5 mm), and spatial relation to ventricle. In a first step 98 the amygdalois nucleus is extracted 100, shown with the result in image 102. In FIG. 3B the processing continues with block 104 of filling the lenticular nucleus (level-set) 106, with accompanying image 108, showing lentiform nucleus. After which block 110 is performed for removing non-brain tissue 112, shown with accompanying image 114, indicating an example of non-brain tissue. The final step 116 is shown for segmenting the optic nerve 118 (3D graph cuts), with accompanying image 120, indicating an example of optic nerve.

The use of the anatomical information for segmenting the physiological structures within the medical image allows image reconstruction of these surfaces in a fully automatic manner. For the structures of the brain, the technology presented reconstructs a watertight (closed) topologically correct surfaces of the brain in less than 30 minutes for a set of MRI images.

Brain extraction is performed utilizing this technology with an automatic approach for identification of head orientation and brain bounding box from input MRI data. The center of mass (COM) of MRI data is first found, after which the three orthogonal planes are examined passing this COM. The plane about which maximal symmetry is found is considered to be the sagittal plane. After which the "bottom of the head" from the sagittal plane is determined to further identify coronal and axial plane. After the orientation of input MRI data is identified, a bounding box of the brain is estimated. A geometric localization, such as ellipsoid in shape, is performed at the center of the bounding box as the initialization. The brain regions are then extracted from the image data set by evolving a level-set function starting from the initialization.

FIG. 4A through FIG. 4E depict full-head image data (FIG. 4A), initialization (FIG. 4B and FIG. 4C) and an extraction result (FIG. 4D and FIG. 4E) according to an embodiment of the present technology.

FIG. 5A through FIG. 5E similarly depict half-head image data (FIG. 5A), initialization (FIG. 5B and FIG. 5C) and an extraction result (FIG. 5D and FIG. 5E) according to an embodiment of the present technology.

Figure 6A:
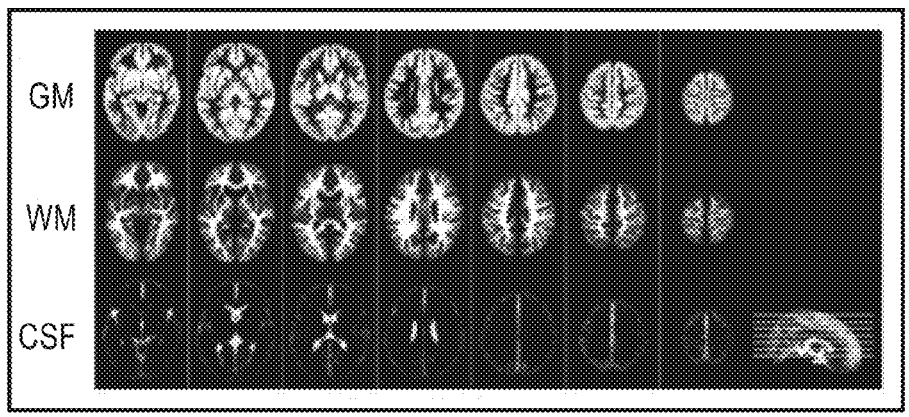
FIG. 6A and FIG. 6B are images showing brain tissue classification and inhomogeneity correction according to an embodiment of the disclosed technology.
Figure 6B:
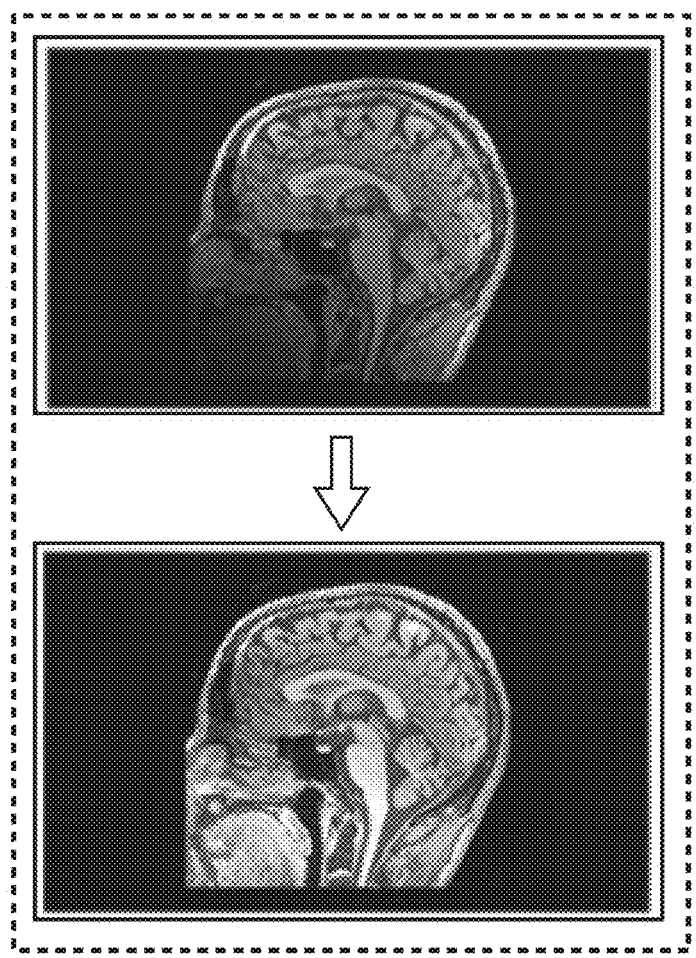

FIG. 6A and FIG. 6B illustrate processes for classifying brain tissue and correcting for inhomogeneity. By way of example, FIG. 6A depicts different structures of the brain classified as grey matter (GM), white matter (WM) and cerebrospinal fluid (CSF). In FIG. 6B an example of an original image is shown in the upper portion of the figure, and after correcting the inhomogeneity according to the presented technology in the lower portion of the figure. In a preferred embodiment both of these processes are integrated into one fuzzy C-means clustering framework. One of ordinary skill in the art will recognize that fuzzy clustering means (C-means) are a class of algorithms which provide clustering analysis in which the allocation of data points to clusters is not fixed or "hard" (all-or-nothing), but "fuzzy" in the same nature as is understood with fuzzy logic (e.g., heuristically determined).

Figure 7:
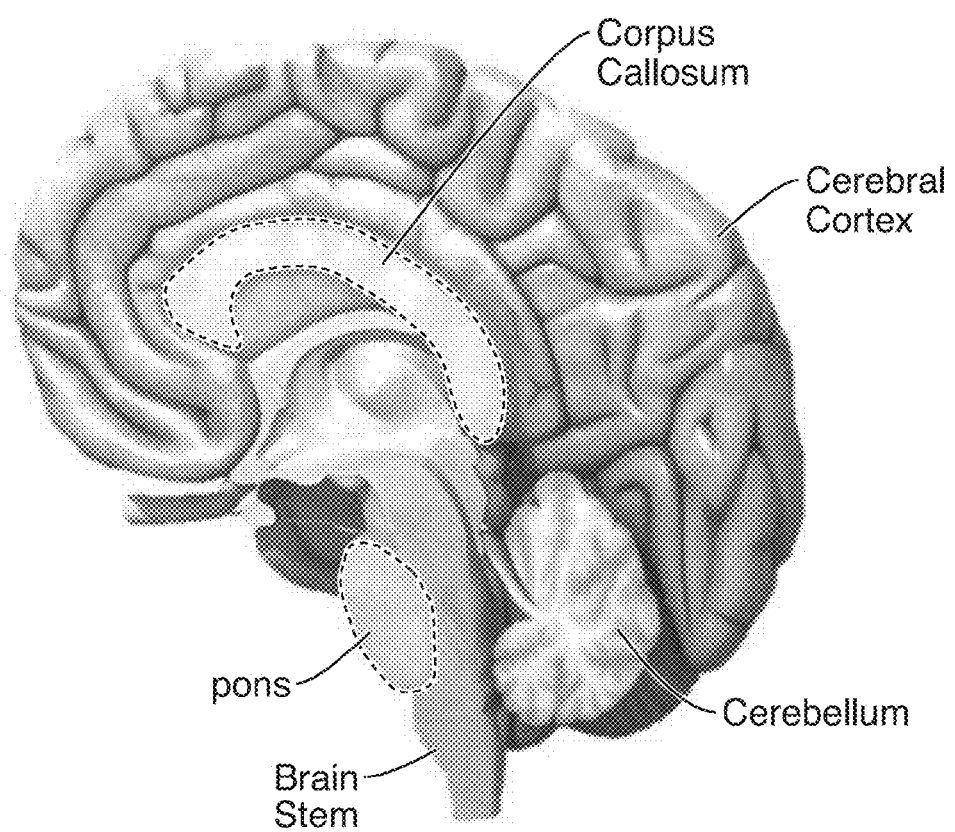
FIG. 7 is an image of brain structures identified as seed regions in the process of brain tissue segmentation and reconstruction according to an embodiment of the disclosed technology.

FIG. 7 depicts structures of the brain, showing cerebral cortex, corpus callosum, cerebellum, brainstem and pons. In the technology presented, seeds of the cerebrum and of the brain stem are determined, as seen by the dashed line regions shown in the figure.

FIG. 8A through FIG. 8C illustrate segmentation results from using the above seeds and determining graph cuts in segmenting the different brain regions seen from the side, front and back in these figures. It should be appreciated that in the actual output of these elements are preferably output in different color, instead of the shading seen in these black and white images found in the present application.

Figure 9B:
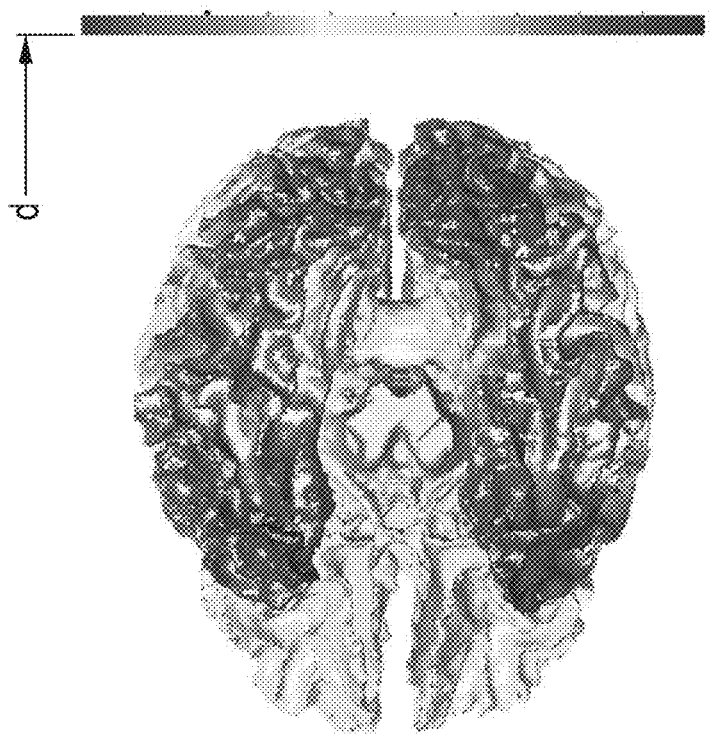
FIG. 9A and FIG. 9B are images of the process of closing a surface according to an embodiment of the disclosed technology.
Figure 9A:
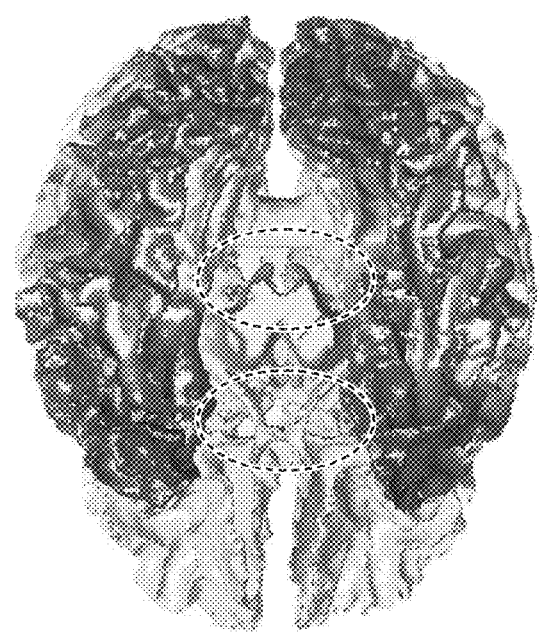

FIG. 9A and FIG. 9B illustrate the process of closing a surface. In this case, closing the surface at the brain stem. In reconstructing cortical surfaces it is important to preserve the physical shape of the cortex, as it is a single sheet of connected tissue. By closing the surface at the brain stem, it can be described as having the topology of a sphere. In FIG. 9A, open elements of this cortical surface are highlighted with the dashed line ovals, which have been closed as seen in FIG. 9B. The shading as seen by the legend bar at the far right of the figure indicates normalized distance to the camera.

Figure 10:
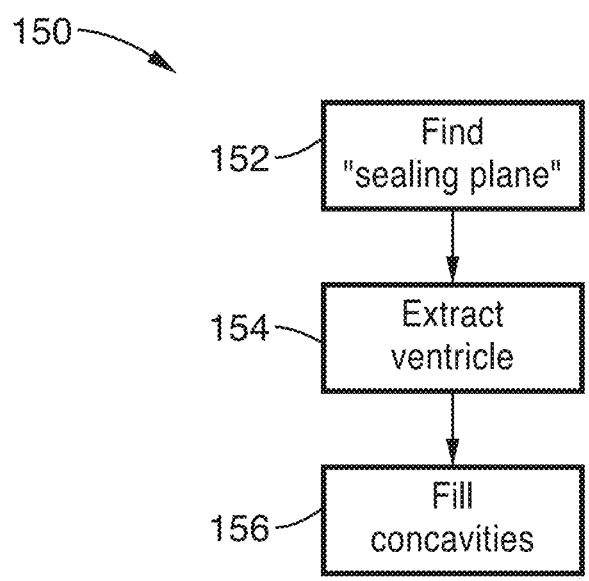
FIG. 10 is a flow diagram of the process for closing a surface according to an embodiment of the disclosed technology.

FIG. 10 illustrates general steps 150 in closing a surface for a structure, such as the brain stem as exemplified. First, "sealing planes" are found (distinguished) 152 in the brain stem, a ventricle structure is extracted 154, and then the extracted ventricle is utilized as seeds to fill 156 the concavities in the WM.

Although the discussion above is substantially directed to brain structures, it should be appreciated that the present disclosure for segmenting and reconstructing structure surfaces is applicable to other organs (e.g., abdominal organs like liver, spleen) from any desired 3D imaging method (e.g., MRI or CT).

The enhancements described in the presented technology can be readily implemented within various medical image processing systems. It will be appreciated that medical imaging systems are implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby instructions (programming) stored in the memory are executed on the processor performing the steps described. The computer and memory devices were not depicted in the diagrams for the sake of simplicity of illustration, as one of ordinary skill in the art recognizes the use of computer devices for carrying out steps involved with any form of image processing on medical images. The presented technology is non-limiting with regard to memory and computer-readable media, insofar as these are non-transitory, and thus not constituting a transitory electronic signal.

Embodiments of the present disclosure may be described with reference to flowchart illustrations of methods and systems according to embodiments of the disclosure, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that that the present disclosure encompasses multiple embodiments which include, but are not limited to, the following:

1. An apparatus for automatically processing medical images of brain regions, comprising: (a) a medical imaging system configured for scanning a patient's brain in three dimensions to generate three dimensional (3D) medical brain image data; (b) at least one processor configured for automatically performing image processing on said 3D medical brain image data; (c) a memory storing instructions executable by said processor; and (d) a display device coupled to said computer processor, said display device configured for displaying 3D medical images; (e) said instructions when executed performing steps comprising: (e)(i) determining brain structures in a brain extraction process which removes non-brain image elements; (e)(ii) classifying brain tissue types; (e)(iii) segmenting cerebrum imaging which determines which portions of the image information belong to specific physiological structures; (e)(iv) anatomical refinement comprising ventricle filling in response to ventricle information extracted from the image, removal of dura mater, and correcting subcortical area; and (e)(v) reconstruction of surfaces of the brain including both white and grey matter in response to generating a surface mesh and correcting mesh topology; (e)(vi) wherein each of the above steps are performed in response to said programming without user interaction or intervention; and (e)(vii) displaying a 3D brain image showing classification of brain tissues, segmentation of different brain portions, surface reconstructions, with ventricle filling on said display.

2. The apparatus of any preceding embodiment, wherein said three dimensional (3D) medical image data comprises a form of magnetic resonance images (MRI).

3. The apparatus of any preceding embodiment, wherein said instructions for said processor are configured for performing said segmentation and reconstruction of cortical surfaces which includes reconstructing both inner-surfaces and outer-surfaces of the cortex.

4. The apparatus of any preceding embodiment, wherein said instructions for said processor are configured for brain extraction processing based on stored anatomical information.

5. The apparatus of any preceding embodiment, wherein said instructions for said processor are configured for brain extraction processing to remove non-brain voxels in the head region, including comprising skin, bone, muscle, fat and dura.

6. The apparatus of any preceding embodiment, wherein said instructions for said processor are configured for performing said brain extraction processing including non-uniformity correction which corrects non-uniformities in raw magnetic imaging data due to magnetic field inhomogeneity.

7. The apparatus of any preceding embodiment, wherein said instructions for said processor are configured for separating cerebellum and brain stem image information from cerebrum specific physiological structures in the process of performing said segmenting cerebrum imaging.

8. The apparatus of any preceding embodiment, wherein said instructions for said processor are configured for said segmenting cerebrum imaging, comprising: (a) identifying mid-sagittal plane (MSP) in response to a process of searching for a plane in medical image space about which maximal symmetry is found; (b) identifying corpus callosum and pons from intersection of MSP and white matter (WM) member function as output under tissue classification; and (c) identifying of one set of structures is then utilized in identifying others sets of structures.

9. The apparatus of any preceding embodiment, wherein said instructions for said processor are configured for performing said segmenting cerebrum imaging in which identifying of corpus callosum and pons are utilized as initial seeds of cerebrum and cerebellum and brain stem identification with a graph-cut being applied for segmenting cerebrum imaging.

10. The apparatus of any preceding embodiment, wherein said instructions for said processor are configured for said ventricle filling is performed in response to ventricle information received from multiple orientations.

11. The apparatus of any preceding embodiment, wherein said instructions for said processor are configured for providing multiple orientations of ventricle information as from at least a front, side and back view.

12. The apparatus of any preceding embodiment, wherein said instructions for said processor are configured for performing said ventricle filling in which internal cavities of the white matter (WM) are filled before performing the surface reconstruction toward preserving the physical shape of the cortex.

13. The apparatus of any preceding embodiment, wherein said instructions for said processor are configured for preserving the physical shape of the cortex, estimated as a spherical topology in response to use of Euler characteristics.

14. The apparatus of any preceding embodiment, wherein said instructions for said processor are configured for performing said surface reconstruction of the white matter (WM) by generating an isosurface mesh from WM volume data.

15. The apparatus of any preceding embodiment, wherein said instructions for said processor are configured for performing said surface reconstruction of grey matter (GM) based on WM segmentation results to refine GM and cerebrospinal fluid (CSF) classification to improve sulci description, followed by generating a surface mesh.

16. The apparatus of any preceding embodiment, wherein said instructions for said processor are configured for performing said reconstruction which includes a sulci refinement process during GM surface reconstruction.

17. The apparatus of any preceding embodiment, wherein said instructions for said processor are configured for reconstruction of brain surfaces by outputting image data which is in different colors denoting different regions of the brain.

18. The apparatus of any preceding embodiment, wherein said instructions for said processor are configured for reconstruction of brain surfaces while preserving physical shape of the cortex, as it is a single sheet of connected tissue, whereby said programming is configured for closing this surface at the brain stem.

19. An apparatus for automatically processing medical images of brain regions, comprising: (a) a medical imaging system configured for scanning a patient's brain in three dimensions to generate three dimensional (3D) medical brain image data; (b) a computer processor configured for automatically performing image processing on said 3D medical brain image data; (c) a display device coupled to said computer processor, said display device configured for displaying 3D medical images; and (d) a memory storing programming executable on the computer processor; (e) said programming when executed performing steps comprising: (e)(i) determining brain structures in a brain extraction process which removes non-brain image elements; (e)(ii) classifying brain tissue types; (e)(iii) segmenting cerebrum imaging which determines which portions of the image information belong to specific physiological structures, in response to: (e)(iii)(A) identifying mid-sagittal plane (MSP) in response to a process of searching for a plane in medical image space about which maximal symmetry is found, (e)(iii)(B) identifying corpus callosum and pons from intersection of MSP and white matter (WM) member function as output under tissue classification, and (e)(iii)(C) identifying of one set of structures is then utilized in identifying others sets of structures; (e)(iv) anatomical refinement comprising ventricle filling in response to ventricle information extracted from the image, removal of dura mater, and correcting subcortical area; and (e)(v) reconstruction of surfaces of the brain including both white and grey matter in response to generating a surface mesh and correcting mesh topology; (e)(vi) wherein each of the above steps are performed in response to said programming without user interaction or intervention; and (e)(vii) displaying a 3D brain image showing classification of brain tissues, segmentation of different brain portions, surface reconstructions, with ventricle filling on said display.

20. A method of automatically processing medical images of brain regions, comprising: (a) performing a medical scan of a patient's brain to create three dimensional medical brain image data; (b) determining brain structures in a brain extraction process performed on a computer processor configured for performing three dimensional medical image processing; (c) removing non-brain image elements in determining brain structures; (d) classifying brain tissue types; (e) segmenting cerebrum imaging which determines which portions of the image information belong to specific physiological structures; (f) refining anatomical elements comprising ventricle filling in response to ventricle information extracted from the image, removal of dura mater, and correcting subcortical area; (g) reconstruction of surfaces of the brain including both white and grey matter in response to generating a surface mesh and correcting mesh topology; and (h) displaying a 3D brain image showing classification of brain tissues, segmentation of different brain portions, surface reconstructions, with ventricle filling on a display device.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for automatically processing medical images of brain regions, comprising:
    (a) a medical imaging system configured for scanning a patient's brain in three dimensions to generate three dimensional (3D) medical brain image data;
    (b) at least one processor configured for automatically performing image processing on said 3D medical brain image data;
    (c) a memory storing instructions executable by said processor; and
    (d) a display device coupled to said computer processor, said display device configured for displaying 3D medical images;
    (e) said instructions when executed performing steps comprising:
        (i) determining brain structures in a brain extraction process which removes non-brain image elements;
        (ii) classifying brain tissue types;
        (iii) segmenting cerebrum imaging which determines which portions of the image information belong to specific physiological structures;
        (iv) anatomical refinement comprising ventricle filling in response to ventricle information extracted from the image, removal of dura mater, and correcting subcortical area;

(v) reconstructing surfaces of the brain including both white and grey matter in response to generating a surface mesh and correcting mesh topology;

(vi) wherein each of the above steps are performed in response to said programming without user interaction or intervention; and (vii) displaying a 3D brain image showing classification of brain tissues, segmentation of different brain portions and surface reconstructions, with ventricle filling on said display.

2. The apparatus recited in claim 1, wherein said three dimensional (3D) medical image data comprises a form of magnetic resonance images (MRI).

3. The apparatus recited in claim 1, wherein said instructions for said processor are configured for performing said segmentation and reconstruction of cortical surfaces which includes reconstructing both inner-surfaces and outer-surfaces of the cortex.

4. The apparatus recited in claim 1, wherein said instructions for said processor are configured for brain extraction processing based on stored anatomical information.

5. The apparatus recited in claim 1, wherein said instructions for said processor are configured for brain extraction processing to remove non-brain voxels in the head region, including comprising skin, bone, muscle, fat and dura.

6. The apparatus recited in claim 1, wherein said instructions for said processor are configured for performing said brain extraction processing including non-uniformity correction which corrects non-uniformities in raw magnetic imaging data due to magnetic field inhomogeneity.

7. The apparatus recited in claim 1, wherein said instructions for said processor are configured for separating cerebellum and brain stem image information from cerebrum specific physiological structures in the process of performing said segmenting cerebrum imaging.

8. The apparatus recited in claim 1, wherein said instructions for said processor are configured for said segmenting cerebrum imaging, comprising:

(a) identifying mid-sagittal plane (MSP) in response to a process of searching for a plane in medical image space about which maximal symmetry is found;

(b) identifying corpus callosum and pons from intersection of MSP and white matter (WM) member function as output under tissue classification; and (c) utilizing the identity of one set of structures for identifying other sets of structures.

9. The apparatus recited in claim 8, wherein said instructions for said processor are configured for performing said segmenting cerebrum imaging in which the identity of corpus callosum and pons are utilized as initial seeds of cerebrum and cerebellum and brain stem identification with a graph-cut being applied for segmenting cerebrum imaging.

10. The apparatus recited in claim 1, wherein said instructions for said processor are configured for said ventricle filling and performed in response to ventricle information received from multiple orientations.

11. The apparatus recited in claim 10, wherein said instructions for said processor are configured for providing multiple orientations of ventricle information as from at least a front, side and back view.

12. The apparatus recited in claim 1, wherein said instructions for said processor are configured for performing said ventricle filling in which internal cavities of the white matter (WM) are filled before performing the surface reconstruction toward preserving the physical shape of the cortex.

13. The apparatus recited in claim 1, wherein said instructions for said processor are configured for preserving the physical shape of the cortex, estimated as a spherical topology in response to use of Euler characteristics.

14. The apparatus recited in claim 1, wherein said instructions for said processor are configured for performing said surface reconstruction of the white matter (WM) by generating an isosurface mesh from WM volume data.

15. The apparatus recited in claim 1, wherein said instructions for said processor are configured for performing said surface reconstruction of grey matter (GM) based on WM segmentation results to refine GM and cerebrospinal fluid (CSF) classification to improve sulci description, followed by generating a surface mesh.

16. The apparatus recited in claim 1, wherein said instructions for said processor are configured for performing said reconstruction which includes a sulci refinement process during GM surface reconstruction.

17. The apparatus recited in claim 1, wherein said instructions for said processor are configured for reconstruction of brain surfaces by outputting image data which is in different colors denoting different regions of the brain.

18. The apparatus recited in claim 1, wherein said instructions for said processor are configured for reconstruction of brain surfaces while preserving physical shape of the cortex, as it is a single sheet of connected tissue, whereby said programming is configured for closing this surface at the brain stem.

19. An apparatus for automatically processing medical images of brain regions, comprising:

(a) a medical imaging system configured for scanning a patient's brain in three dimensions to generate three dimensional (3D) medical brain image data;

(b) a computer processor configured for automatically performing image processing on said 3D medical brain image data;

(c) a display device coupled to said computer processor, said display device configured for displaying 3D medical images; and (d) a memory storing programming executable on the computer processor;

(e) said programming when executed performing steps comprising:

(i) determining brain structures in a brain extraction process which removes non-brain image elements;

(ii) classifying brain tissue types;

(iii) segmenting cerebrum imaging which determines which portions of the image information belong to specific physiological structures, in response to: (iii)(A) identifying mid-sagittal plane (MSP) in response to a process of searching for a plane in medical image space about which maximal symmetry is found, (iii)(B) identifying corpus callosum and pons from intersection of MSP and white matter (WM) member function as output under tissue classification, and (iii)(C) the identifying of one set of structures then utilized in identifying others sets of structures;

(iv) anatomical refinement comprising ventricle filling in response to ventricle information extracted from the image, removal of dura mater, and correcting subcortical area;

(v) reconstruction of surfaces of the brain including both white and grey matter in response to generating a surface mesh and correcting mesh topology;

(vi) wherein each of the above steps are performed in response to said programming without user interaction or intervention; and (vii) displaying a 3D brain image showing classification of brain tissues, segmentation of different brain portions and surface reconstructions, with ventricle filling on said display.

20. A method of automatically processing medical images of brain regions, comprising:
- (a) performing a medical scan of a patient's brain to create three dimensional medical brain image data;
- (b) determining brain structures in a brain extraction process performed on a computer processor configured for performing three dimensional medical image processing;
- (c) removing non-brain image elements in determining brain structures;
- (d) classifying brain tissue types;
- (e) segmenting cerebrum imaging which determines which portions of the image information belong to specific physiological structures;
- (f) refining anatomical elements comprising ventricle filling in response to ventricle information extracted from the image, removal of dura mater, and correcting subcortical area;
- (g) reconstruction of surfaces of the brain including both white and grey matter in response to generating a surface mesh and correcting mesh topology; and
- (h) displaying a 3D brain image showing classification of brain tissues, segmentation of different brain portions and surface reconstructions, with ventricle filling on a display device.

* * * * *